(12) United States Patent
Amirzadeh-Asl

(10) Patent No.: US 8,287,837 B2
(45) Date of Patent: Oct. 16, 2012

(54) TITANIUM-CONTAINING ADDITIVE

(75) Inventor: Djamschid Amirzadeh-Asl, Moers (DE)

(73) Assignee: Sachtleben Chemie GmbH, Duisburg (DE)

( * ) Notice: Subject to any disclaimer, the term of this patent is extended or adjusted under 35 U.S.C. 154(b) by 684 days.

(21) Appl. No.: 12/374,073

(22) PCT Filed: Aug. 2, 2007

(86) PCT No.: PCT/EP2007/058036
§ 371 (c)(1),
(2), (4) Date: May 8, 2009

(87) PCT Pub. No.: WO2008/015259
PCT Pub. Date: Feb. 7, 2008

(65) Prior Publication Data
US 2009/0270243 A1 Oct. 29, 2009

(30) Foreign Application Priority Data
Aug. 2, 2006 (DE) .......................... 10 2006 036 388

(51) Int. Cl.
*C01G 23/047* (2006.01)

(52) U.S. Cl. ....................................... 423/611; 501/96.1

(58) Field of Classification Search .................. 423/610, 423/611, 615; 501/96.1
See application file for complete search history.

(56) References Cited

FOREIGN PATENT DOCUMENTS

| | | |
|---|---|---|
| DE | 4419816 | 6/1995 |
| DE | 44 37 548 C1 | 2/1996 |
| DE | 19705996 | 8/1998 |
| EP | 0611740 | 8/1994 |
| EP | 0 859 063 A | 8/1998 |
| EP | 1 295 656 A | 3/2003 |
| GB | 2 025 832 A | 1/1980 |
| RU | 2 179 583 C1 | 2/2002 |
| RU | 2 255 114 C1 | 6/2005 |
| WO | WO 2007/048406 A | 5/2007 |

OTHER PUBLICATIONS

Dierich, et al. "Eigenschaften Synthetischer Titanhaltiger Materialien zur Verschleissminderung in Hochofen" Aug. 16, 1999.
Titania Slag for Improving Blast Furnace Hearth Lining Life, Stahl Und eisen—Aug. 25, 1980.
Dierich, et al. Properties of Synthetic Titanium-Containing Materials for Wear Reduction if Blast Furnaces, *Stahl und Eisen*, 119 No. 8 (1999), pp. 85-89 [*With English translation*].
Titania Slag for Improving Blast Furnace Hearth Lining Life, *Stahl und Eisen*, 100 No. 17 (1980), p. 1037.

*Primary Examiner* — Edward Johnson
(74) *Attorney, Agent, or Firm* — Fulbright & Jaworski LLP

(57) ABSTRACT

A titanium-containing additive, a method for its production and methods of using the additive.

12 Claims, No Drawings

TITANIUM-CONTAINING ADDITIVE

This application is a §371 of PCT/EP2007/058036 filed Aug. 2, 2007, which claims priority from DE 10 2006 036 388.4 filed Aug. 2, 2006

The subject matter of the invention is a titanium-containing additive, a method for its production, and its use.

The use of titanium-containing additives in metallurgical processes has been known for a long time. The action of titanium-containing additives is based, in this connection, on the formation of high-temperature-resistant and wear-resistant Ti(C,N) compounds that have temperature-dependent solubility in crude iron. When there is a fall below the solubility limit, which can be the case in particular in defective hearth regions as a result of increased heat dissipation outwards, the separation of the Ti(C,N) compounds from the crude iron, the deposit thereof in the regions of the brickwork that are worn to a greater extent and thus an intrinsic "heat-repair effect" result.

For this purpose, various titanium-containing materials are used in metallurgical processes or for the production of products. The titanium-containing additives that are used in the prior art are visually titanium-containing materials.

Thus, for example, the use of residues from $TiO_2$ production ($TiO_2$ residues) as a titanium-containing additive is known in the metallurgical industry. A titanium-containing additive consisting of $TiO_2$ residues and further substances is disclosed in DE-C-4419316.

DE-C-19705996 discloses a method for producing a $TiO_2$-containing additive. In this case, a mixture of $TiO_2$ residues and iron or iron compounds is thermally treated at 200 to 1300° C. A disadvantage of this technical teaching is the complicated metering and mixing of the $TiO_2$ residues with the other respective constituents of the additive.

EP-A-0 611 740 discloses the use of residues from $TiO_2$ production ($TiO_2$ residues) with other constituents as a titanium-containing additive in order to increase the durability of the refractory brick lining of a furnace. In this connection, $TiO_2$-containing moulded bodies, such as briquettes, pellets or granular material, are produced from the residues in elaborate methods. In metallurgical processes and in order to produce, products, however, these products are very lumpy, and cannot be used, or can only be used with poor results, Furthermore, the injection of finely divided titanium-containing additives directly into the region of the hearth is known. The injection of titanium-containing additives in the region of the hearth has a series of advantages:

- the introduction is effected in the immediate vicinity of the points of damage or the regions of the brick lining that are to be protected; thus the titanium-containing substances can be used in a targeted manner and in lower concentrations;
- the time of action, in particular when hot spots occur in the wall of the furnace, is shorter;
- no incrustation by titanium-containing substances occurs in the blast furnace shaft;
- smaller quantities used and a higher degree of conversion to Ti(C,N) compounds result in improved slag quality as a result of lower $TiO_2$ contents and thus less problematic marketing of the slag sand.

It is also known that lump ilmenite (ilmenite structure: $FeTiO_3$) can be used as a natural source for the titanium that is required in order to reduce wear in the blast furnace.

The titanium ore ilmenite, a mineral with the formula $FeTiO_3$, is used as a starting material for the production of titanium dioxide. Ilmenite is used for this purpose also in combination with the titanium ore rutile ($TiO_2$).

The extraction of ilmenite ore is effected in open-cast mining. In this connection, the ore is first broken into small pieces with a size of approximately 12 mm and then ground to a fine powder. The impurities contained in the ore are separated in an elaborate method. After the gangue has been separated, an ilmenite concentrate is obtained from the ore with a proportion of titanium dioxide of approximately 50% by weight (calculated from the total titanium content). (When proportions of titanium dioxide in % by weight are spoken of in the following, unless otherwise specified, within the meaning of the invention what is meant thereby is the proportion calculated from the total titanium content).

Moreover, titanium-dioxide-rich slag is used as a raw material to obtain titanium dioxide. In this case, ilmenite ore is worked and comminuted in the seam. Subsequently, the ground ore is mixed with coal and melted in an arc furnace. Quality iron is produced thereby. The titanium-dioxide-rich slag, for example the so-called Sorel slag, that is yielded in this process can contain up to 90% by weight titanium dioxide (calculated from the total titanium content).

In contrast with synthetic titanium-containing materials, the natural titanium-containing materials, on account of their lumpiness or their lack of fine granularity, are not suitable or are only suitable in part and with poor results for use in metallurgical processes, for use in refractory materials, for injection into metallurgical furnaces in order to increase the durability of the furnace brick linings, for injection into slag foams in steel production, for use in tap-hole compounds, for use in carbon/graphite electrodes, for use as an additive for building materials, for carbon/graphite bricks, for carbon/graphite tamping compounds, for carbon-bound products, as catalysts. The lack of fine granularity and the angular structure of the particles of these natural raw materials give rise as a result of their abrasive properties in use, for example when blown into a blast furnace, to severe erosion (corrosion; wear . . . ) in the blow moulds so that long-lasting use is not possible. In the case of the production of products, the reaction rate is insufficient when natural titanium-containing materials are used on account of their lumpiness or their lack of fine granularity and leads to unsatisfactory results. Consequently, the natural titanium-containing materials that are present in this form cannot be used as titanium-containing additives within the meaning of the invention.

An object of the present invention is to provide titanium-containing additives on a natural basis.

A further object of the present invention is to provide titanium-containing additives based on $TiO_2$-rich slags.

What is to be understood by "titanium-containing additive" within the meaning of the invention is fine-grained titanium-containing additives that are able to form high-temperature-resistant and wear-resistant titanium compounds, such as, for example, aluminium titanates, magnesium titanates, Ti(C,N) compounds or mixtures of such compounds, in processes or during the production of products with co-reactants that are contained in these processes or with suitable co-reactants that are present during the production of products. "On a natural basis" within the meaning of the invention signifies that the titanium-containing portion of the titanium-containing additives consists up to 100% of natural titanium-containing material.

In particular, an object of the present invention is to provide such titanium-containing additives for use in metallurgical processes,
for use in refractory materials,
for injection in metallurgical furnaces in order to increase the durability of the furnace brick linings,
for use in steel production, for the formation of slag foams in steel production,
for use in tap-hole compounds,
for injection-moulding, channel and/or repair compounds,
for use in carbon/graphite electrodes,
for use as an additive for building materials,
for use in carbon/graphite bricks, for use in carbon/graphite tamping compounds, for use in carbon-bound products, and
as a catalyst.

In accordance with the invention, this object is achieved by means of the features of the main claim. Preferably, developments are characterised in the subclaims.

In accordance with the invention, the titanium-containing materials are micronized in a suitable way therefor. The micronization can then be effected, for example, in a pinned-disk mill, a Coloplex mill, a Circoplex mill, a steam or air-jet mill or ball mill or in a grinding dryer. The titanium-containing material that is obtained in this way has a 100% fineness of less than 5 mm, preferably less than 2 mm, particularly preferably less than 0.5 mm and especially preferably less than 0.2 mm. The average particle size, in accordance with the invention, amounts preferably to 0.01 μm to 2,000 μm, especially preferably to 0.1 μm to 1,000 μm. The material thus obtained is suitable as a titanium-containing additive within the meaning of the invention.

Titanium ores, titanium-dioxide-rich slags or mixtures of these materials in any composition can be used as titanium-containing starting materials.

The titanium ores and titanium-dioxide-rich slags used to produce the titanium-containing additive in accordance with the invention contain 15 to 95, preferably 25 to 90% by weight $TiO_2$ (calculated from the total titanium content). The titanium ores can be used in an unrefined form or after separation of impurities and also the gangue in order to produce the titanium-containing additive.

The additive in accordance with the invention contains 20 to 98, preferably 25 to 95, particularly preferably 30 to 95, especially preferably 40 to 90% by weight $TiO_2$ (calculated from the total titanium content).

The additive in accordance with the invention can contain in addition to the titanium-containing materials, selected from titanium ores and/or titanium-dioxide-rich slags, furthermore, synthetic titanium-dioxide-containing materials.

The synthetic titanium-dioxide-containing materials that are provided in accordance with the invention contain 20 to 100, preferably 30 to 100% by weight $TiO_2$ (calculated from the total titanium content).

The synthetic titanium-dioxide-containing materials can then be selected from the materials listed below or mixtures thereof:
intermediate, coupled and/or finished products from the production of titanium dioxide. The materials can then originate not only from the production of titanium dioxide in accordance with the sulphate process, but also from the production of titanium oxide in accordance with the chloride process. The intermediate and coupled products can be drawn off from the current $TiO_2$-production.
residues from the production of titanium dioxide. The materials can then originate not only from the production of titanium dioxide in accordance with the sulphate process, but also from the production of titanium dioxide in accordance with the chloride process; if necessary, the materials are pretreated before use for the production of titanium-containing additives, for example by neutralization, washing and/or pre-drying.
residues from the chemical industry, for example from $TiO_2$-containing catalysts, in turn, for example, from DENOX catalysts.

The synthetic titanium-dioxide-containing materials can be used in the form of powders, filter cakes, pastes or suspensions.

The production of the additive in accordance with the invention is effected by mixing the titanium-containing materials.

In addition, the titanium-containing materials can be heat-treated.

Drying is preferably used as heat-treatment, and particularly preferably drying at temperatures between 100 and 1200° C.

Within the scope of the invention it is also provided that the titanium-containing materials are first micronized separately and then mixed in a mixer in the desired ratio depending on the application. Furthermore, in accordance with the invention it is provided that the titanium-containing materials are mixed first and micronized after heat-treatment depending on the application.

Depending on the intended use, the titanium-containing additive in accordance with the invention can contain further auxiliary substances and/or additives, for example coal, reducing carbon, and/or metal oxides, again for example iron oxides.

The additive in accordance with the invention, is used in accordance with the invention:
in metallurgical processes,
in refractory materials,
for injection in metallurgical furnaces in order to increase the durability of the furnace brick linings,
in steel production,
for the formation of slag foams in steel production,
in tap-hole compounds,
in injection-moulding, channel and/or repair compounds,
in carbon/graphite electrodes,
as an additive for building materials,
for the production of carbon/graphite bricks, carbon/graphite tamping compounds, carbon-bound products, and
as a catalyst.

The invention claimed is:

1. A method for increasing the durability of a brick lining of a metallurgical furnace by injecting into the furnace a titanium containing additive into the metallurgical furnace, wherein the temperature of the furnace is sufficient such that the titanium containing additive forms a high-temperature-resistant and wear-resistant titanium compound, wherein the titanium-containing material has a 100% fineness of less than 0.2 mm, and wherein the titanium-containing additive is able to form high-temperature-resistant and wear-resistant titanium compound in a process or during the production of a product with a co-reactant contained in the process or production with a suitable co-reactant that is present during the process or production, wherein the titanium-containing material comprises at least one of a fine-grained, natural titanium-containing material or a fine. grained TiO-rich slag.

2. The method of claim 1, wherein the titanium containing material comprises at least one of aluminum titanate, magnesium titanate or a Ti(c,N) compound.

3. The method according to claim 1, wherein the titanium containing material is a titanium-containing ore, a titanium-containing slag or a synthetic titanium-containing material.

4. The method according to claim 1, wherein the titanium containing material comprises a titanium-containing ore or a synthetic titanium-containing material.

5. The method according to claim 1, wherein the titanium containing material is natural or synthetic.

6. The method according to claim 1, comprising the titanium containing material comprises $TiO_2$ rich slag and a synthetic titanium-containing material.

7. The method according to claim 1, wherein the titanium containing material comprises a titanium-containing ore, a $TiO_2$-rich slag and a synthetic titanium-containing material.

8. The method according to claim 1, wherein the natural titanium containing material is ilmenite or rutile and the titanium-containing slag is Sorel slag.

9. The method according to claim 1, wherein the titanium-containing material contains 15 to 95% by weight $TiO_2$ calculated from the total titanium content.

10. The method according to claim 1, comprising 20 to 98% by weight $TiO_2$ calculated from the total titanium content.

11. The method according to claim 1, comprising at least one synthetic titanium containing material selected from an intermediate, coupled or finished product from the production of titanium dioxide, wherein the synthetic titanium containing material can be prepared from the production of titanium dioxide in accordance with the sulphate process, but also from the production of titanium oxide in accordance with the chloride process, and the intermediate and coupled products can be drawn off from the current $TiO_2$-production; residues from the production of titanium dioxide or mixtures thereof, in which case the materials can then originate not only from the production of titanium dioxide in accordance with the sulphate process, but also from the production of titanium dioxide in accordance with the chloride process; titanium-containing residues from the chemical industry.

12. The method according to claim 1, further comprising a further additive selected from the group consisting of coal, reducing carbon or a metal oxide.

* * * * *